United States Patent
Vyas et al.

(10) Patent No.: US 8,664,822 B2
(45) Date of Patent: Mar. 4, 2014

(54) BI-PERMANENT MAGNETS IN SYNCHRONOUS MACHINES

(75) Inventors: Rajeev Vyas, Rochester Hills, MI (US); Thomas Wolfgang Nehl, Shelby Township, MI (US); Alexandru Rajala, Farmington Hills, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 13/483,261

(22) Filed: May 30, 2012

(65) Prior Publication Data
US 2013/0320796 A1    Dec. 5, 2013

(51) Int. Cl.
*H02K 21/12* (2006.01)

(52) U.S. Cl.
USPC ............ 310/156.53; 310/156.39; 310/156.43

(58) Field of Classification Search
USPC ............. 310/156.38–156.39, 156.43–156.59
See application file for complete search history.

(56) References Cited

U.S. PATENT DOCUMENTS

| 6,815,859 | B2 * | 11/2004 | Sakuma et al. | 310/156.53 |
| 8,030,817 | B2 * | 10/2011 | Sakai et al. | 310/156.53 |
| 2003/0094875 | A1 * | 5/2003 | Sakuma et al. | 310/156.56 |
| 2005/0110355 | A1 * | 5/2005 | Sakuma et al. | 310/156.53 |
| 2008/0224558 | A1 * | 9/2008 | Ionel | 310/156.57 |
| 2010/0007232 | A1 * | 1/2010 | Komuro et al. | 310/156.01 |

* cited by examiner

*Primary Examiner* — Thanh Lam

(57) ABSTRACT

A rotor for an interior permanent synchronous machine. A rotor core structure includes an outer cylindrical wall juxtaposed to an air gap. A plurality of arcuately-shaped cavities is formed within the rotor core structure. The plurality of arcuately-shaped cavities is substantially concentrically layered with respect to an outer cylindrical wall of the rotor core structure. Each arcuately-shaped cavity extending between first and second end sections is juxtaposed to the outer cylindrical surface wall of the rotor structure and includes an intervening center section. A plurality of permanent magnets is inserted within the plurality of arcuately-shaped cavities. Each first end section retains a respective first permanent magnet having a first magnet field strength. Each second end section retains a respective second permanent magnet having the first magnetic field strength. Each center section retains a respective third permanent magnet having a second magnet field strength less than the first magnetic field strength.

20 Claims, 3 Drawing Sheets

BI-PERMANENT MAGNETS IN SYNCHRONOUS MACHINES

BACKGROUND OF INVENTION

An embodiment relates generally to permanent magnet motors.

A permanent magnet synchronous motor is an AC motor in which rotation rate of the shaft is synchronized with the frequency of the AC supply current. A rotating electric field is generated in the stator and the rotor follows the rotating electrical field of the stator. The rotor rotates in step with the field of the stator at a same rate. The rotor and the stator are said to be in synchronization.

The permanent magnets used in conventional rotors are configured to provide a uniform field strength. Neodymium magnets, also known as rare earth magnets, are often desired due to their strong magnetic field strength which provides enhanced torque in motors. However, using rare earth magnets in a motor is costly and increases the overall price of the motor.

SUMMARY OF INVENTION

An advantage of an embodiment is the reduction in the content and weight of rare earth magnets which reduces the overall cost of the motor. The interior permanent synchronous machine utilizes bi-permanent magnets (i.e., the combination of two or more different types of magnet materials) for reducing the number of rare earth magnets utilized in the rotor. A combination of rare earth magnets and ferrite magnets, or magnets of a same material composition having different magnetic field strengths, is in the rotor in a multilayer manner. The rare earth magnets and ferrite magnets gradually overlap between two adjacent cavities for minimizing a reduction in the demagnetization of the ferrite magnets as a result of the magnet field generated by the rare earth magnets.

An embodiment contemplates a rotor for a permanent synchronous machine. A rotor core structure having a cylindrical body. The cylindrical body includes an outer cylindrical wall of the rotor core structure juxtaposed to an air gap. A plurality of arcuately-shaped cavities is formed within the rotor core structure. The plurality of arcuately-shaped cavities is substantially concentrically layered with respect to an outer cylindrical wall of the rotor core structure. Each arcuately-shaped cavity extending between first and second end sections is juxtaposed to the outer cylindrical surface wall of the rotor structure and includes an intervening center section. A plurality of permanent magnets is inserted within the plurality of arcuately-shaped cavities. Each first end section retains a respective first permanent magnet having a first magnet field strength. Each second end section retains a respective second permanent magnet having the first magnetic field strength. Each center section retains a respective third permanent magnet having a second magnet field strength less than the first magnetic field strength.

An embodiment contemplates a permanent synchronous machine including a stator and a rotor core structure. The rotor core structure is radially offset from the stator and separated from the stator by an air gap. The rotor core structure has a cylindrical body including an outer cylindrical wall of the rotor core structure. A plurality of arcuately-shaped cavities is formed within the rotor core structure. The plurality of arcuately-shaped cavities is substantially concentrically layered with respect to an outer cylindrical wall of the rotor core structure. Each arcuately-shaped cavity extending between first and second end sections is juxtaposed to the outer cylindrical surface wall of the rotor structure and having an intervening center section. A plurality of permanent magnets is inserted within the plurality of arcuately-shaped cavities. Each first end section retains a respective first permanent magnet having a first magnet field strength. Each second end section retains a respective second permanent magnet having the first magnetic field strength. Each center section retains a respective third permanent magnet having a second magnet field strength less than the first magnetic field strength.

DETAILED DESCRIPTION

Figure 1:
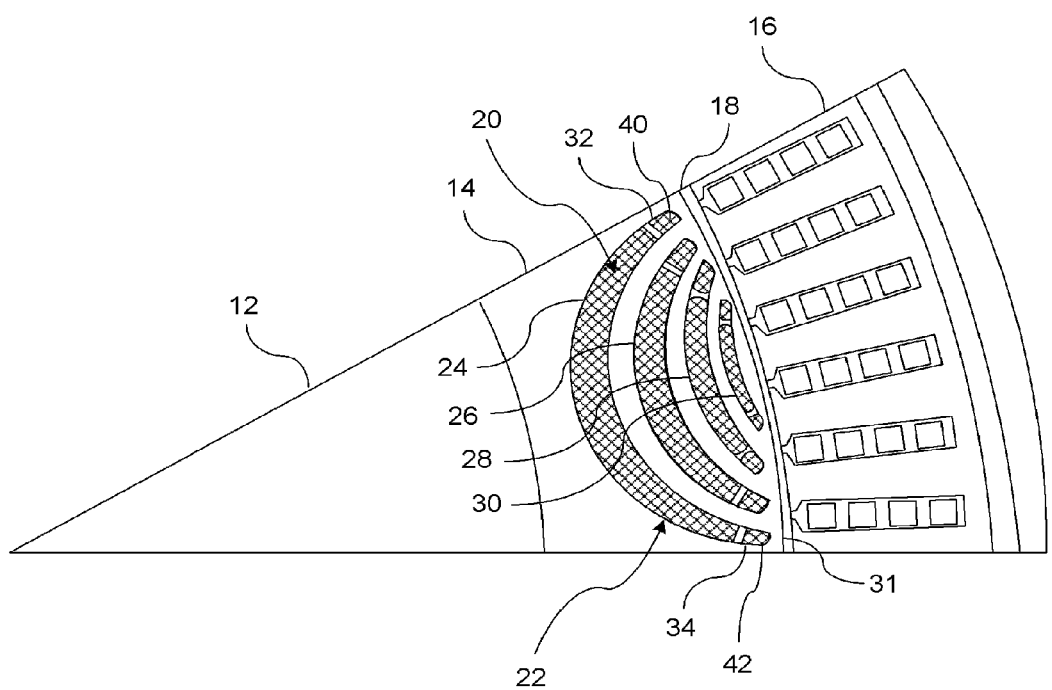
FIG. 1 is a section view of an internal permanent magnet motor.

There is shown in FIG. 1 a section view of a permanent magnet motor 10. The permanent magnet motor 10 includes a rotor 12 coupled to a shaft 14. The rotor can include any number of poles (e.g. 2, 4, 6, etc). The sectional view as shown illustrates one pole of the rotor 12 (e.g. north pole). A stator 16 is radially offset from the rotor 12 and is separated therefrom by an air gap 18.

The function of the rotor 12 is to drive a component coupled to the shaft 14. The stator 16 when excited by an excitation voltage (e.g., 3-phase supply) generates a rotating magnetic field within the motor 10. The rotor, which functions as a permanent magnet locks in with the rotating magnetic field generated by the stator 16. The rotor 12 rotates along with the rotating magnetic field. When the rotator locks in with the rotating magnetic field, the motor 10 is in synchronization.

The rotor 12 as shown in FIG. 1 utilizes interior permanent magnets 20. It should be understood that the motor can be any type of permanent magnet motor and does not require interior permanent magnets. The interior permanent magnets 20 are inserted within a plurality of arcuately-shaped cavities 22 formed within the rotor 12. The plurality of arcuately-shaped cavities 22 are structured in a multilayer manner. The plurality of arcuately-shaped cavities 22 includes a first arcuately-shaped cavity 24, a second arcuately-shaped cavity 26, a third arcuately-shaped cavity 28, and a fourth arcuately-shaped cavity 30. Each of the arcuately-shaped cavities is substantially concentrically layered with respect to an outer cylinder wall 31 of the rotor 12.

Each arcuately-shaped cavity includes a first end section 32 and second end section 34 that are juxtaposed to the outer cylindrical surface wall 31 of the rotor 12. Each arcuately-shaped cavity includes an intervening center section 36 extending between the first end section 32 and the second end section 34.

The interior permanent magnets 20 include a first magnet 40 disposed within a first end section 32 of each cavity layer generating a magnetic field having a first magnet field strength, and a second magnet 42 disposed within the second end section 34 of each cavity layer having the first magnetic field strength. A third magnet 44 is disposed between the first magnet 40 and the second magnet 42 of each cavity layer. The third magnet 44 generates a magnetic field having second magnetic field strength. The first magnetic field strength generated by the first magnet 40 and second magnet 42 is greater than the second magnetic field strength generated by the third magnet 44. The third magnet 44 may include a single curved magnet conforming to the shape of a respective cavity, or the third magnet 44 may include more than one permanent magnet inserted within a respective cavity layer. The number of third magnets 44 utilized within a respective cavity layer may be based on the ease of assembling the third magnets into the respective cavity. That is, due to the curvature of the cavity, it may be more efficient and practical to utilize smaller magnets for ease of assembly.

The first and second magnets 40, 42 may be a different material composition that than the third magnet 44 or may be of a same material composition, but have different magnetic field strengths. For example, the first magnet 40 and second magnet 42 may be a rare earth magnet (e.g., neodymium magnet) and the third magnet 44 may be a ferrite magnet. Alternatively, the first magnet 40, second magnet 42, and the third magnet 44 may all be ferrite magnets or all rare earth magnets where the first and second magnets 40, 42 have a stronger magnetic field than the third magnet 44. The overall cost of the magnets is reduced by requiring less of the higher magnetic field strength materials. However, unless the relative placement of the different materials is properly configured, the resultant magnetic field may not be effective at operating the motor.

Figure 2:
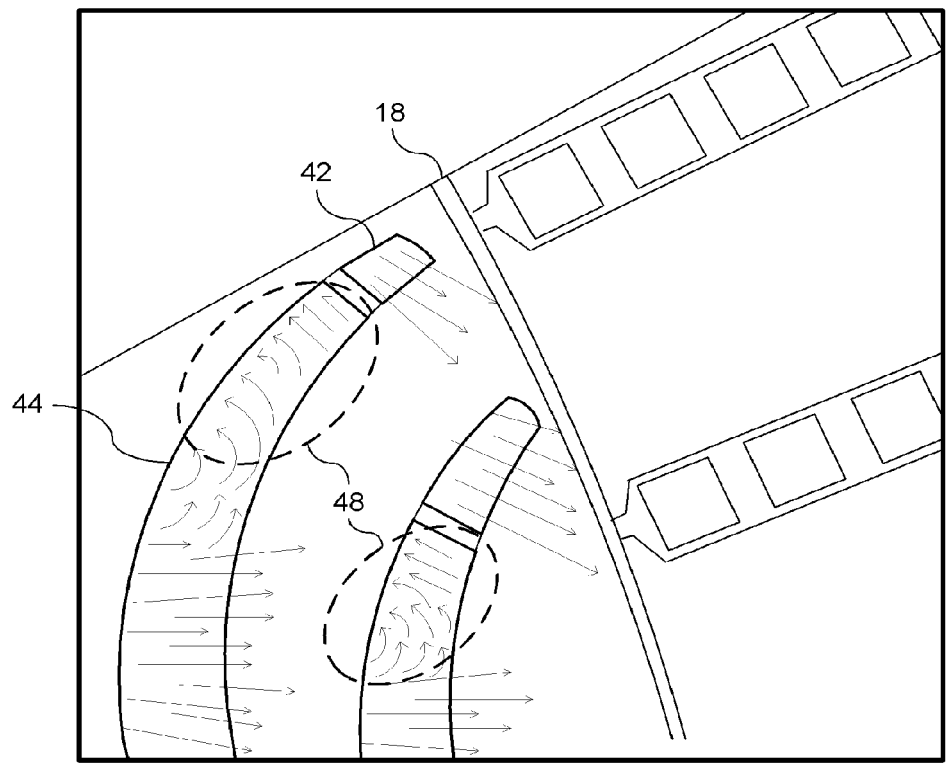
FIG. 2 is a section view of the internal permanent magnet motor having demagnetization.

An issue in utilizing bi-permanent magnets is the demagnetization of the magnet generating the weaker magnetic field, by the stronger one. As shown in FIG. 2, if the magnets are not properly positioned between the respective cavity layers, the flux flow generated by the ferrite magnets will be demagnetized by the adjacent rare earth magnets. In FIG. 2, both the rare magnets 40 and the ferrite magnets 44 are north pole magnets. Due to the magnetic field exerted by the rare magnets 40 on the ferrite magnets 44, the flux flow from the rare earth magnets reverses direction away from the air gap 18. This is illustrated by the flow of flux shown generally by arrows 48. As a result, the motor loses torque and efficiency.

Figure 3:
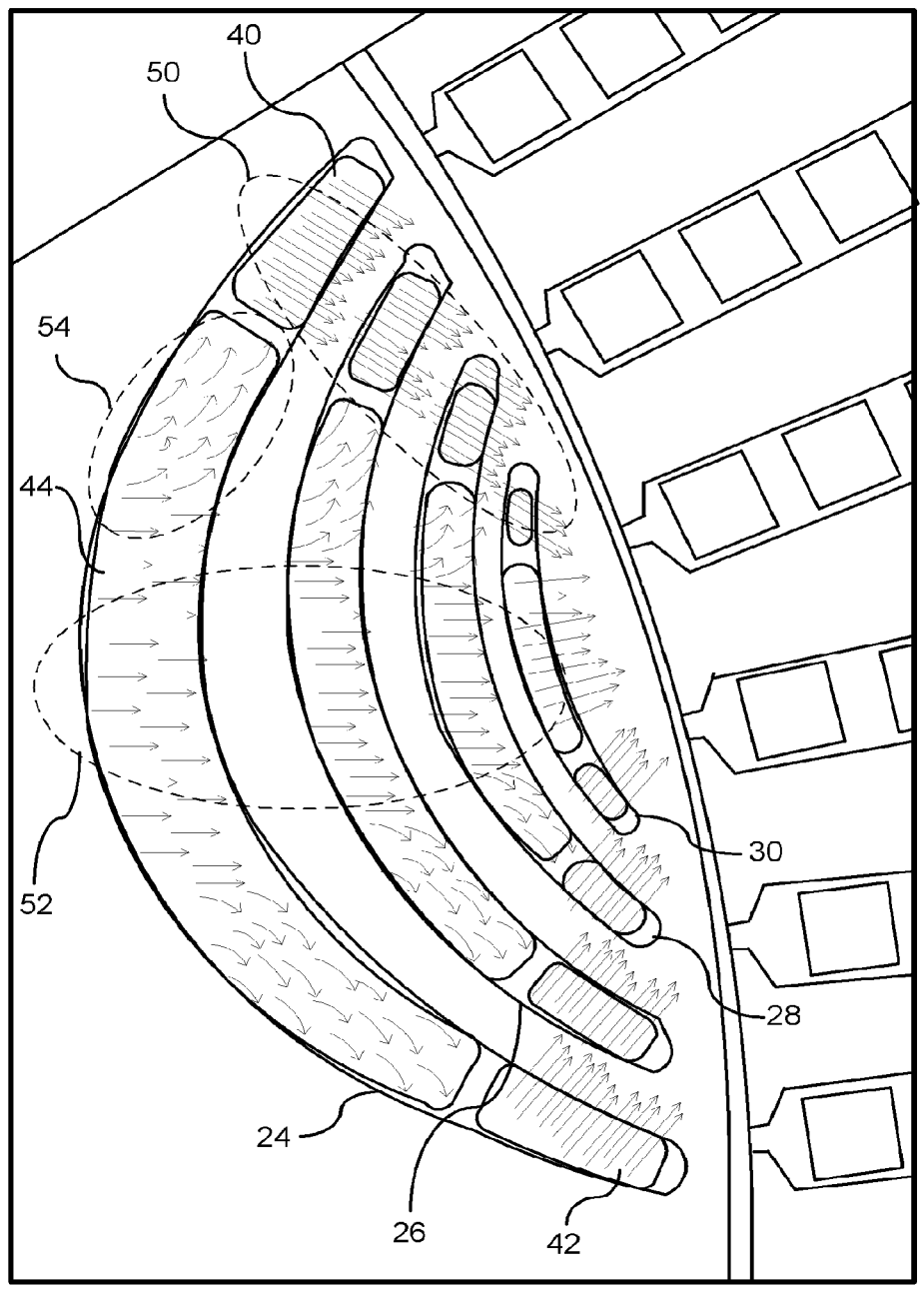
FIG. 3 is a section view of the internal permanent magnet motor having minimum demagnetization.

To avoid demagnetization of the ferrite magnets, the rare earth magnets are positioned so that the rare magnets in a succeeding cavity gradually overlap the ferrite magnets of a preceding cavity. As shown in FIG. 3, the first cavity layer 24, a second cavity layer 26, a third cavity layer 28, and a fourth cavity later 30 each contains rare earth magnets 40, 42 in the first and second end sections 32, 34 and ferrite magnets the center intervening section 36. The rare earth magnets 40, 42 in the second cavity layer 26 angularly overlap the ferrite magnet 44 in the first cavity layer 40. Similarly, the rare earth magnets 40, 42 of the third cavity layer 28 angularly overlap the ferrite magnet 44 of the second cavity layer 26. The length of the angular overlap between the second/third cavity layers in contrast to the first/second cavity layers gradually increases. Moreover, the rare earth magnets 40, 42 of the fourth cavity layer 30 angularly overlap the ferrite magnet 44 of the third cavity layer 28. The length of the angular overlap between the third/fourth cavity layers in contrast to the second/third cavity layers gradually increases. As a result, a progressive gradual angular overlapping of a ferrite magnet of a preceding cavity layer and rare earth magnet of a succeeding cavity layer is designed for each of the cavity layers.

The positioning for achieving the length of the angular overlap between respective magnets of each cavity layer is based on optimizing a flow of flux generated by the both the rare earth magnets and the ferrite magnets. The positioning of the rare earth magnets of a respective succeeding cavity layer to the rare earth magnets of a succeeding cavity layer is identified when the flow of flux collectively generated by the rare earth magnets is directed perpendicular to the rare earth magnets and into the air gap 18. This is illustrated generally by 50 in FIG. 3.

In addition, the positioning of the rare earth magnets of a respective succeeding cavity layer to the ferrite magnets of a preceding cavity layer is also collectively utilized when positioning the respective magnets. The optimal length of overlap between the respective magnets of each cavity layer is identified when the demagnetization of the magnetic field of the ferrite magnets is minimized. As shown in FIG. 3, a flow of flux from a center portion of the ferrite magnets 44 is directed substantially perpendicular to the ferrite magnets and to the air gap 18 as is shown generally at 52. The flow of flux at the end regions of the ferrite magnets 44 however are substantially directed toward the rare earth magnets 40, 42 shown generally at 54. Although the flux flow at the end regions are not substantially perpendicular to the ferrite magnets and directed at the air gap 18, demagnetization of the ferrite magnets is minimized in contrast to the flux flow illustrated in FIG. 2. Identifying the length of overlap of the magnets between the respective cavity layers is accomplished by determining magnet positions that provides the minimal demagnetization of the ferrite magnets. The configuration of FIG. 3 in utilizing a gradual and progressive overlap of the magnets between the respective cavity layers generates an enhanced torque for the motor in comparison to the magnet configuration of FIG. 2. As a result, cost associated with the utilizing a same magnet within the rotor, such as rare earth magnets may be reduced, by utilizing two sets of magnets having different magnetic field strengths in the configuration as described herein.

While certain embodiments of the present invention have been described in detail, those familiar with the art to which this invention relates will recognize various alternative designs and embodiments for practicing the invention as defined by the following claims.

What is claimed is:

1. A rotor for a permanent synchronous machine comprising:
    a rotor core structure having a cylindrical body, the cylindrical body including an outer cylindrical wall of the rotor core structure juxtaposed to an air gap;
    a plurality of arcuately-shaped cavities formed within the rotor core structure, the plurality of arcuately-shaped cavities substantially concentrically layered with respect to an outer cylindrical wall of the rotor core structure, each arcuately-shaped cavity extending between first and second end sections is juxtaposed to the outer cylindrical surface wall of the rotor structure and includes an intervening center section; and
    a plurality of permanent magnets inserted within the plurality of arcuately-shaped cavities;
    wherein each first end section retains a respective first permanent magnet having a first magnet field strength, wherein each second end section retains a respective second permanent magnet having the first magnetic field strength, and wherein each center section retains a respective third permanent magnet having a second magnet field strength less than the first magnetic field strength.

2. The rotor of claim 1 wherein the first permanent magnet in a succeeding arcuately-shaped cavity layer angularly overlaps the first permanent magnet in a preceding arcuately-shaped cavity layer, wherein a length of the angular overlap between the first permanent magnets of the preceding cavity arcuately-shaped cavity layer and a succeeding arcuately-shaped cavity layer is determined based on optimizing of a flow of flux generated by the first permanent magnets toward the outer cylindrical surface wall.

3. The rotor of claim 2 wherein the second permanent magnet in the succeeding arcuately-shaped cavity layer angularly overlaps the second permanent magnet in the preceding arcuately-shaped cavity layer, wherein a length of the angular overlap between the second permanent magnets of the preceding cavity arcuately-shaped cavity layer and a succeeding arcuately-shaped cavity layer is determined based on optimizing of a flow of flux generated by the second permanent magnets toward the outer cylindrical surface wall.

4. The rotor of claim 3 wherein the angular overlapping of the first permanent magnets and angular overlapping of the third permanent magnets between each succeeding and preceding arcuately-shaped cavity layers prevents the flow of flux generated by the first permanent magnets and second permanent magnets toward the third permanent magnets in each respective arcuately-shaped cavity layer.

5. The rotor of claim 4 wherein the first permanent magnet in a respective preceding arcuately-shaped cavity layer functions as source of magnetic flux relative to the first permanent magnet of a respective succeeding arcuately-shaped cavity layer, and wherein the first permanent magnet of the respective succeeding cavity arcuately-shaped layer functions as a sink of magnetic flux relative to the first permanent magnet for the respective preceding arcuately-shaped cavity layer for directing a flow of flux generated by the first permanent magnet of each arcuately-shaped cavity layer toward the outer cylindrical surface wall.

6. The rotor of claim 5 wherein the second permanent magnet in the respective preceding arcuately-shaped cavity layer functions as source of magnetic flux relative to the second permanent magnet of the respective succeeding arcuately-shaped cavity layer, and wherein the second permanent magnet of the respective succeeding arcuately-shaped cavity layer functions as a sink of magnetic flux relative to the second permanent magnet for the respective preceding arcuately-shaped cavity layer for directing a flow of flux generated by the second permanent magnet of each cavity layer toward the outer cylindrical surface wall.

7. The rotor of claim 6 wherein the first permanent magnets disposed in the respective succeeding arcuately-shaped angularly overlaps the third permanent magnet in a preceding arcuately-shaped cavity layer, wherein a length of the angular overlap between the first permanent magnets of the succeeding cavity arcuately-shaped cavity layer and the third permanent magnet of the preceding arcuately-shaped cavity layer is determined based on minimizing a reduction in a demagnification of the second permanent magnets.

8. The rotor of claim 7 wherein the second permanent magnets disposed in the respective succeeding arcuately-shaped cavity layer angularly overlaps the third permanent magnet in a preceding arcuately-shaped cavity layer, wherein a length of the angular overlap between the second permanent magnets of the succeeding arcuately-shaped cavity layer and the third permanent magnet of the preceding arcuately-shaped cavity layer is determined based on minimizing a reduction in a demagnetization of the second permanent magnets.

9. The rotor of claim 1 wherein the first and second permanent magnets are rare earth magnets and the third permanent magnets are ferrite magnets.

10. The rotor of claim 1 wherein the first, second, and third permanent magnets are rare earth magnets.

11. The rotor of claim 1 wherein the first, second, and third permanent magnets are ferrite magnets.

12. The rotor of claim 1 wherein the first, second, and third permanent magnets are arcuate-shaped for conforming to the plurality of arcuate-shaped cavities within the rotor core structure.

13. The rotor of claim 1 wherein at least two third permanent magnets are disposed within each arcuate-shaped cavity layer.

14. A permanent synchronous machine comprising:
a stator;
a rotor core structure radially offset from the stator and separated from the stator by an air gap, the rotor core structure have a cylindrical body including an outer cylindrical wall of the rotor core structure;
a plurality of arcuately-shaped cavities formed within the rotor core structure, the plurality of arcuately-shaped cavities substantially concentrically layered with respect to an outer cylindrical wall of the rotor core structure, each arcuately-shaped cavity extending between first and second end sections is juxtaposed to the outer cylindrical surface wall of the rotor structure and having an intervening center section; and
a plurality of permanent magnets inserted within the plurality of arcuately-shaped cavities;
wherein each first end section retains a respective first permanent magnet having a first magnet field strength, wherein each second end section retains a respective second permanent magnet having the first magnetic field strength, and wherein each center section retains a respective third permanent magnet having a second magnet field strength less than the first magnetic field strength.

15. The permanent synchronous machine of claim 14 wherein the first permanent magnet in a succeeding arcuately-shaped cavity layer angularly overlaps the first permanent magnet in a preceding arcuately-shaped cavity layer, wherein a length of the angular overlap between the first permanent magnets of the preceding cavity arcuately-shaped cavity layer and a succeeding arcuately-shaped cavity layer is determined based on optimizing of a flow of flux generated by the first permanent magnets toward the air gap.

16. The permanent synchronous machine of claim 15 wherein the second permanent magnet in the succeeding arcuately-shaped cavity layer angularly overlaps the second permanent magnet in the preceding arcuately-shaped cavity layer, wherein a length of the angular overlap between the second permanent magnets of the preceding cavity arcuately-shaped cavity layer and a succeeding arcuately-shaped cavity layer is determined based on optimizing of a flow of flux generated by the second permanent magnets toward the air gap.

17. The permanent synchronous machine of claim 16 wherein the angular overlapping of the first permanent magnets and angular overlapping of the second permanent magnets between each succeeding and preceding arcuately-shaped cavity layers prevents the flow of flux generated by the first permanent magnets and second permanent magnets toward the third permanent magnets in each respective arcuately-shaped cavity layer.

18. The permanent synchronous machine of claim 17 wherein the first permanent magnet in a respective preceding arcuately-shaped cavity layer functions as source of magnetic flux relative to the first permanent magnet of a respective succeeding arcuately-shaped cavity layer, and wherein the first permanent magnet of the respective succeeding cavity arcuately-shaped layer functions as a sink of magnetic flux relative to the first permanent magnet for the respective preceding arcuately-shaped cavity layer for directing a flow of flux generated by the first permanent magnet of each arcuately-shaped cavity layer toward the air gap.

19. The permanent synchronous machine of claim 14 wherein the first and second permanent magnets are rare earth magnets and the third permanent magnets are ferrite magnets.

20. The permanent synchronous machine of claim 14 wherein the first, second, and third permanent magnets are magnets of a same material composition.

\* \* \* \* \*